(12) United States Patent
Sekhar

(10) Patent No.: US 10,478,911 B2
(45) Date of Patent: Nov. 19, 2019

(54) METHOD OF JOINING METALS AND NON-METALS WITH FOIL AND PRODUCTS SO JOINED

(71) Applicant: Jainagesh Sekhar, Cincinnati, OH (US)

(72) Inventor: Jainagesh Sekhar, Cincinnati, OH (US)

(73) Assignee: MHI Health Devices, LLC, Cincinnati, OH (US)

( * ) Notice: Subject to any disclaimer, the term of this patent is extended or adjusted under 35 U.S.C. 154(b) by 285 days.

(21) Appl. No.: 15/296,123

(22) Filed: Oct. 18, 2016

(65) Prior Publication Data

US 2017/0106463 A1   Apr. 20, 2017

Related U.S. Application Data

(60) Provisional application No. 62/243,711, filed on Oct. 20, 2015.

(51) Int. Cl.
| | | |
|---|---|---|
| *B23K 10/00* | (2006.01) | |
| *B23K 1/005* | (2006.01) | |
| *B23K 35/28* | (2006.01) | |
| *B23K 1/012* | (2006.01) | |
| *B23K 103/00* | (2006.01) | |

(52) U.S. Cl.
CPC ............ *B23K 1/0056* (2013.01); *B23K 1/012* (2013.01); *B23K 10/00* (2013.01); *B23K 35/286* (2013.01); *B23K 2103/52* (2018.08)

(58) Field of Classification Search
CPC ...... B23K 10/00; B23K 1/0051; B23K 1/012; B23K 35/286; B23K 2103/52; B23K 1/0056; H05H 1/26; H05H 1/34
USPC ............. 219/121.46, 121.45, 121.48, 121.59
See application file for complete search history.

(56) References Cited

U.S. PATENT DOCUMENTS

| | | | | |
|---|---|---|---|---|
| 4,040,822 A | * | 8/1977 | Stern ................... | B23K 35/286 420/530 |
| 4,324,356 A | * | 4/1982 | Blair ................... | B23K 35/286 228/193 |
| 6,397,776 B1 | * | 6/2002 | Yang ................... | C23C 16/401 118/719 |
| 7,435,377 B2 | * | 10/2008 | Cho .................... | B22F 7/062 419/14 |
| 8,431,857 B2 | * | 4/2013 | Chang ................. | C04B 35/645 219/76.13 |
| 8,822,875 B2 | * | 9/2014 | Webster ............... | A61B 18/20 219/121.11 |
| 9,624,137 B2 | * | 4/2017 | Elliot .................. | B23K 1/0016 |
| 2015/0181685 A1 | | 6/2015 | Sekhar | |

* cited by examiner

*Primary Examiner* — Mark H Paschall
(74) *Attorney, Agent, or Firm* — Michael C. Connelly

(57) ABSTRACT

A method for the joining of material including metal and non-metals employing foil positioned between as well as structures produced thereby is provided. Such a method may employ thermal plasma as a means to produce the heat necessary for such joining methods. The method may also entail the treating of surfaces of objects by the positioning of materials, including foil, on a surface and subsequent application of thermal plasma.

9 Claims, 6 Drawing Sheets

Example of Plasma Formation

$$N_2 + E \rightarrow N_2^+ + e$$

E stands for energy

Example of Plasma Recombination

$$2N^+ + 2e \rightarrow 2N + E$$

$$2N \rightarrow N_2 + E$$

METHOD OF JOINING METALS AND NON-METALS WITH FOIL AND PRODUCTS SO JOINED

CROSS-REFERENCE TO RELATED APPLICATIONS

This application claims the benefit of U.S. provisional application 62/243,711 entitled "Method of Joining Metals and Non-Metals with Foil and Products so Joined" filed on Oct. 20, 2015 by the applicant, the disclosure of which is hereby incorporated by reference herein in its entirety.

BACKGROUND

Metal and metal ceramic joining are very important processes. These processes are especially important when utilized with shock resistant non-metals such as silicon nitride, molybdenum silicide, silicon carbide and a wide variety of nitrides, carbides, borides, oxynitrides, bor-carbides, carbon nitrides, diamond and other common engineering metallic materials including iron, aluminum, nickel, rare earth and transition metal alloys. The usefulness of many engineering ceramics critically depends upon the ability to successfully join them. The joining of ceramics is considered as a viable alternative technology to the processing and shaping of products with large and/or complex geometric components. Joining is also a viable alternative for the processing of composites consisting of metal and non-metal materials. Similarly, as the functions of tool bits and ceramics become more specific, and their costs remain high, designers are increasingly keen to use ceramics as inserts in otherwise metallic structures. As such, it is absolutely necessary that these ceramic inserts be well bonded to the metal parts. Thus, joining, as part of a manufacturing system, can offer significant advantages for the fabrication of ceramic components, whereas joining is essential for fabricating ceramic-to-metal structures.

The joining of ceramics is a difficult process. Strong, functional and long lasting joints have been realized both in laboratories, and, most importantly, on production floors, with numerous joints presently being in use for applications ranging from engine to biomedical sectors. However, one of the stumbling blocks that still remains is the fabrication of strong refractory joints for, primarily, structural applications. Ceramics such as $Si_3N_4$ (Silicon Nitride) are designed for ever higher temperature applications and, as such, SN joints are expected to survive in corrosive environments at high temperatures under stress. In comparison to SN joints, when Ag—Cu—Ti filler metals are employed at brazing temperatures of 800° C., or higher, the joints realized with these brazes can hardly survive beyond 400° C. in oxidizing environments.

The obvious way to increase the refractory capabilities of the joints is by using more refractory filler metals or intelligent ternary and quaternary alloys, thus escalating the manufacturing costs and undermining the materials stabilities. Apparently, what would be ideal is a joining process that allows for joining, at low temperatures and that yields joints that can last at much higher temperatures. Several commercial filler metals, including Au—Pd, Pd—Ni and Ni—Cr based materials can be identified, with solidus temperatures higher than 900° C. However, among these filler metals only the Ni—Cr ones can loosely be classified as active-metal brazes. Many technically important ceramics, including SN, are not wetted by conventional filler metals.

Recent developments, however, have led to a new class of brazes, called active metal brazes. These brazes react chemically with the ceramics to form wettable products on their surfaces and, thus, do not require prior modification of the ceramic surface. However, the service temperatures achievable with the common active brazes that are based on Ag—Cu matrices are low. Nickel brazes with active additives, such as Cr, have been considered as refractory alternatives. Earlier studies have detailed the development of refractory braze alloys. Silicon nitride joints have been made via brazing with an active Au—Ni—V filler metal. In general, brazing with this filler metal is not as easy and straightforward as with the Ag—Cu—Ti active braze alloys. Useful joint strength values (±400 MPa) have been achieved, with slight improvement of the joint strength when bonding in an argon environment. Eutectic, mono-eutectic, liquidus and solidus are characteristics commonly desired in brazes. Of most importance, very promising high temperature properties of the joints were realized; the 900° C. joint strengths were about 100 MPa, while oxidation of the joints at 900° C. for 100 hours did not affect the as bonded strength.

SUMMARY

The contemplated method is the use of a material, such as foil, between two surfaces to be joined. The materials to be joined may be metals or non-metals. The foil may be comprised of aluminum or carbon, although, other materials are contemplated. Different thicknesses of foil are also anticipated. The materials to be joined as well as the foil between them are then exposed to, or immersed in a thermal plasma stream. The thermal plasma stream may be of the type produced during the thermal plasma treatment method as presented in U.S. patent application Ser. No. 14/578,685 entitled "Thermal Plasma Treatment Method", published as US 2015/0181685 A1, which is incorporated by reference in its entirety herein. It is also anticipated that other forms of heat may be utilized as well. Exposure time, distance between plasma source and materials as well as temperature of the plasma and orientation between the plasma source and materials are adjustable to meet specific requirements.

Such a method has been found to negate the problems associated with the bonding of metals to non-metals as described above. The foil may be used alone or with other materials including fluxes. Products produced by this innovative process are claimed as well by the applicant and inventor.

DRAWINGS—FIGURES

DETAILED DESCRIPTION

In an embodiment of the method, a foil or tape is placed between the objects to be joined. The objects may be wrapped, as well, with foil to produce surface condition as illustrated by FIGS. 2-5. The tape or foil may be composed in part, or in total, of carbon or carbon material or other materials. A film of powder may be used as, or in place of, the foil. The objects and wrapping are subjected to thermal plasma. The foil acts to attract the plasma or specific parts of the plasma in a manner that leads to rapid heat-up of the areas contacting the foil. The surface treatment, in this case joining, is thus performed in a more efficient manner as compared to currently used processes that require far greater time and energy.

Figure 1:
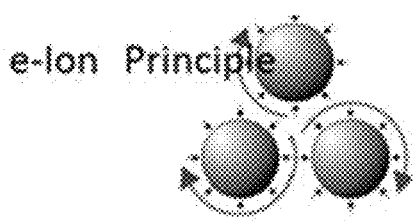
FIG. 1 is a representation of the heating potential for activated ionization including recombination reactions that produce the localized energy release which is the basic principle of thermal plasma as used in the present process.

The method and apparatus of the embodiment and the compositions of the foil and treatable combinations are special and involve selective ion electron combinations, particularly ones that change with temperatures (FIG. 1). Activity increases above 1100° C. Copper brazing, hardfacing and de-burring become particularly effective when foil of the correct pliability is employed. The thickness and number of layers is important as are the molecular weight distribution and fillers in the organic tapes or foils used. Specific embodiments and contemplated uses are discussed and presented below.

As stated above, the foil may be comprised of a variety of materials such as, but not limited to, aluminum and carbon. These foils may be inserted between surfaces, placed upon a surface or in certain cases may be "grown" in situ on a surface due to the effect on the surface of the thermal plasma or other applied heat. Such in situ materials will appear on their own as a coating, for example, during the heating process. A powder may be substituted for a foil. 2D materials (2 dimensional materials), such as graphene may be used instead of a foil as well. Combinations of these alternatives are contemplated by the applicants.

Even when using plasmized-air, the heat-up rate and ionic atmosphere (which is reducing), are conducive for high quality brazing or joining type operations. Dissimilar metals such as aluminum and iron or metal ceramic composites are often easy to braze with thermal plasma and the above method. Redox and/or precursor solutions and gasses for forming oxides, carbides, nitrides, carbonitrides, phosphides, arsendides and combinations and mixtures are fully anticipated. With this technique, antibacterial/antimicrobial/anti-prior/anti-fungus (both dry and wet biofilms) and nanostructures compositions are easily considered for surface enhancements. The applications of amorphous materials further crystallized or directly applied crystallized are also anticipated.

Figure 2:
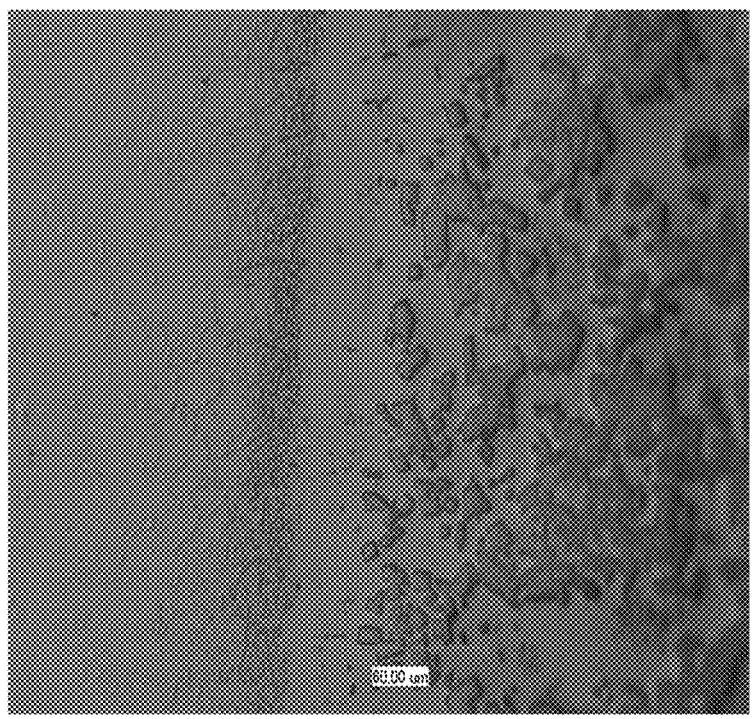
FIG. 2 is the microstructure of nano-grained cemented tungsten carbide (n-WC) treated by the present method.
Figure 3:
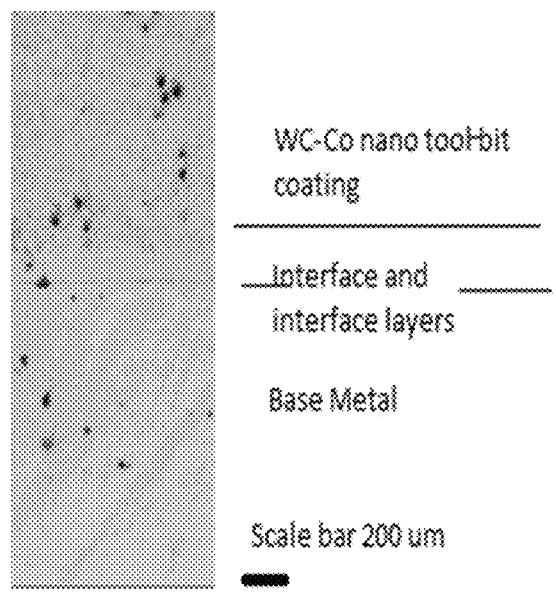
FIG. 3 is a picture of the microstructure a high integrity bond for hard-facing and tool bits produced by the method.
Figure 4:
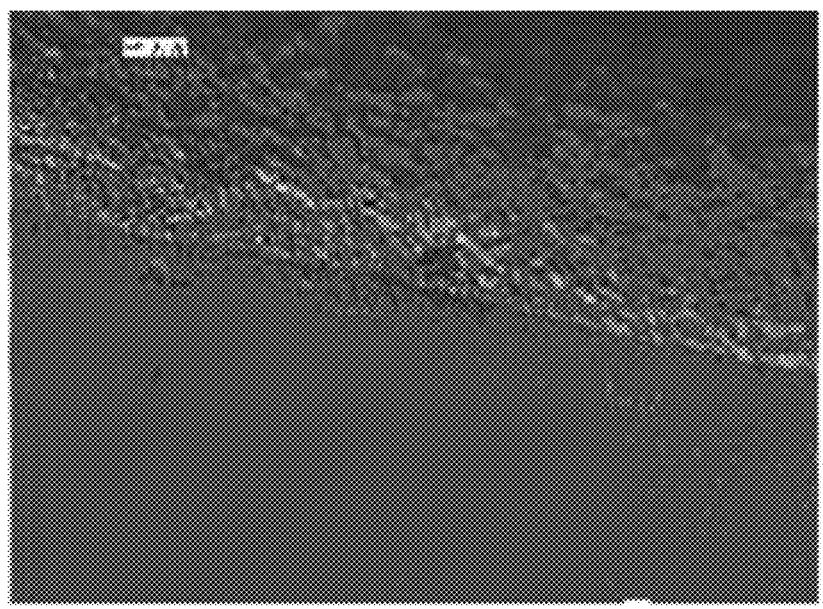
FIG. 4 is the microstructure of NiCoMo hard-facing alloy applied to steel treated by the present process.
Figure 5:
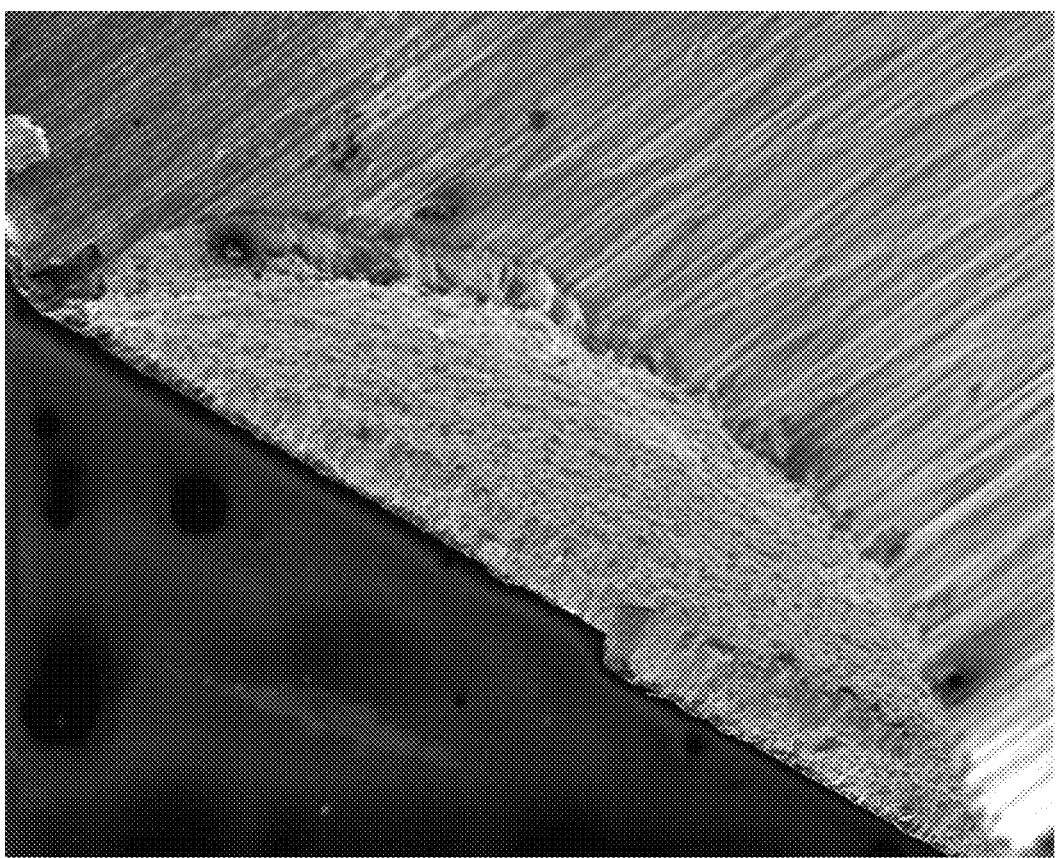
FIG. 5 is a cross section of a drill bit with in situ coating produced by the application of thermal plasma.

Wear resistant surfaces may be made within seconds or minutes with this method by immersion in a plasma plume which may represent an increase of over 100 fold in productivity with lower capital cost and operating costs. Shown in FIGS. 2-4 are typical hard-facing interface microstructures obtained with tungsten carbide nano and with hard facing/hard surfacing alloy on a stainless steel substrate. Fractal dimensional coatings and compositional compositions are easily enabled by foil for multi-gradient brazing, welding and joining and solidification. The surface in FIG. 2 of n-WC was obtained after short exposure to thermal plasma. Other processes are often noted to produce much coarser microstructures. Nano grained cemented tungsten carbide (n-WC) is currently being researched for many potential applications. Thermal plasma treated micrographs of n-WC (FIG. 2) and NiCoMo hard-facing braze alloy to steel (FIG. 4) display excellent hard-face bonding to the substrate as well as very fine and uniform particle size. A high integrity bond for hardfacing and tool bits result in savings of considerable time and energy (FIG. 3).

Traditionally, brazing ceramics to metals and metals to ceramics has been particularly difficult. Just as when brazing ferrous to nonferrous metals, specific alloys and specialized brazing furnaces are required for successful ceramic to metal joining. These furnaces are large, expensive and typically suitable just for a few applications. This lack of adaptability has meant high initial capital costs, limited applications and high per piece costs.

Thermal plasma technology can facilitate ceramic brazing without issues typically faced by brazing furnaces or laser brazing. No large enclosure is necessary to treat parts. Thermal plasma methods can braze ceramics to metals, metals to ceramics, ceramics to ceramics and metals to metals without the typical requirements of a vacuum environment. Associated equipment can be repositioned with minimal effort, allowing for less downtime between batches and lower capital costs. (One plasma device may replace multiple specialized furnaces). A combination of higher operating temperatures, lower energy consumption and patented technologies allows thermal plasma to braze faster and more cost effectively than alternative technologies.

Lack of wettability makes brazing ceramics difficult. Simply put, it is difficult to ionically bond anything to ceramics. Plate metallization and thin film metallization can be effective in certain circumstances, but high tooling costs and size constraints limit widespread adoption. Thermal plasma devices are easily movable and can easily handle on-line/in-line processing, virtually eliminating size constraints typically found in existing technologies.

Thermal plasma devices may be customized for deposition type and shape. Comparisons of price and energy efficiency between ordinary transferred arc or induction plasma deposition or laser and thermal cascade plasma favor the latter. There are also no electrodes to change in plasmas generators. Noise and pollution are minimized while energy efficiency is improved. Brazable materials include yittria zirconia, boron carbide, silicon carbide, molybdenum disilicide and alumina. Possible applications include: glass and nano surface depositions; tungsten carbide and other high wear resistant surfaces for tool bits; tubes and complex shapes; thick alumina on aluminum; and functionally graded coatings. Thermal plasma methods may also be used to braze or otherwise attach copper to an unclean substrate. The brazing may be successful even in the presence of copper oxide. Such an application runs counter to the current art and thinking which call for completely clean surfaces.

In an embodiment of the above process, an object is to provide a method for heating objects and foil to join the objects with the means of heat being thermal plasma. A device for producing this plasma is provided having a first material, a second material, and a heat source. The first material has an inlet side for receiving the gaseous flow, an inner side for discharging the gaseous flow, and a plurality of openings, the openings providing at least one passageway for the inlet side to the inner side. The first material preferably comprises porous ceramic materials. Such a device is depicted in FIG. 6 and is described below.

Figure 6:
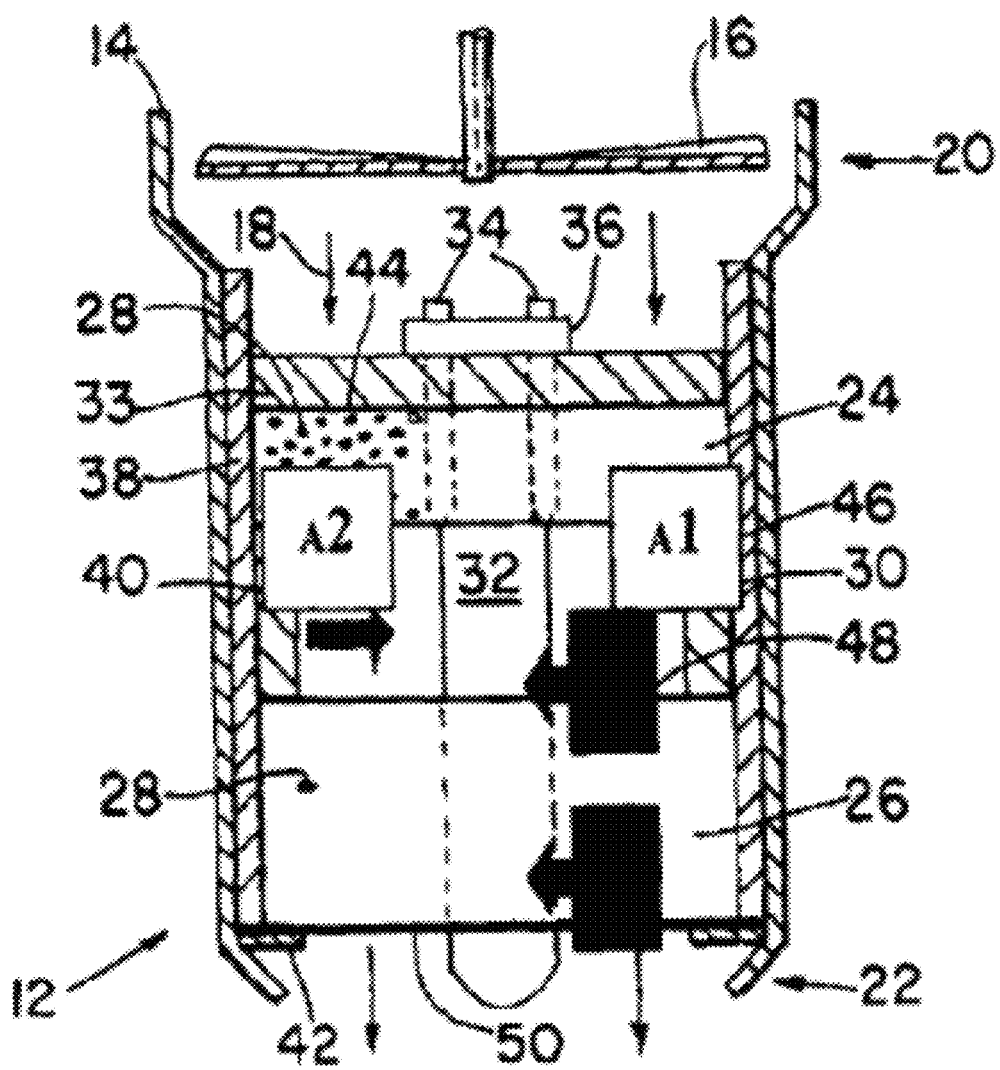
FIG. 6 is a cross section of a device to produce thermal plasma that is anticipated in an embodiment of the joining process.

As shown in FIG. 6, hot plasma blower 12 has a housing comprising a stainless steel shell 14 configured in a substantially cylindrical shape. The blower 12 has an inlet end 20 and an outlet end 22. A fan 16 is disposed near the inlet end 20 for receiving a gaseous flow, depicted by the arrows 18, so that the gaseous flow can be directed through the blower 12 from its inlet end 20 toward its outlet end 22. Fan 18 is preferably driven by an electric motor (not shown).

The gaseous flow 18 to be heated by the blower 12 can comprise a variety of gases or combinations of gases, preferably so that the gases are not chemically reactive when heated to a temperature at which the blower will operate. For example, the gaseous flow 18 can be air that is to be heated and applied to a part or chamber. Also, the gaseous flow can be engine exhaust having particulates that are to be incinerated by the heat of the blower 12. Moreover, although the blower 12 is depicted in its vertical position in FIG. 6, it may be operated in a horizontal manner or at any angle to horizontal.

As shown in FIG. 6, the blower preferably has an insulating liner 38 adjacent the interior surfaces of shell 14 for preventing loss of heat from the interior of the blower. Insulating liner 38 can comprise any insulating material that is physically and chemically stable at the temperature at which the blower is to operate, such as alumina silica fibers, micro quartz fiber and the like.

As is also shown by FIG. 6, the representative embodiment further includes a first material 24 and a second material 26 disposed within the shell 14. The first material 24 includes an inlet side 44 for receiving a gaseous flow (depicted by arrows 18), from the fan 16 and an inner side 46 for discharging the gaseous flow. The second material 26 includes an inner side 48 for receiving the gaseous flow discharged by the first material 24, and an outlet side 50 for discharging this gaseous flow. Preferably, the outer edges of the first and second materials 24 and 26 directly abut the interior surface of the liner 38 such that there is no gap between the liner and the sides of the materials. It is also preferred that the materials 24 and 26 are spaced apart along the longitudinal axis of the blower 12 such that a gap 30 is formed between the two. Spacer 40 can be utilized to maintain the gap 30 between the inner sides 46 and 48 of the first and second materials 24 and 26. The spacer 40 is preferably comprised of an alumina silica cylindrical refractory. Ledge 42 may be utilized to help maintain the materials 24 and 26 at a desired location within the shell 14; the second material 26 can be placed upon the ledge, the spacer 40 may be placed upon the second material, and the first material 24 may be placed upon the spacer. Alternatively, the materials 24 and 26 can be secured to the shell using any manner known in the art such as by bolting, clamping, or the use of high temperature adhesives.

The first material 24 contains a plurality of pores 28 (shown schematically in FIG. 6) that provide at least one passageway for a gaseous flow to travel from the inlet side 44 to the inner side 46. Similarly, the second material 26 also contains a plurality of pores 28 that provide at least one passageway from the inner side 48 to the outlet side 50 of the material. Preferably, the pores 28 within the first material 24 are interconnected so as to provide a plurality of passageways through the material. Similarly, it is preferred that the pores 28 within the second material 26 are interconnected.

The second material has an inner side for receiving the gaseous flow, an outlet side for discharging the gaseous flow, and a plurality of openings, the openings providing at least one passageway from the inner side to the outlet side. The inner side of the first material and the inner side of the second material define a gap for providing residence time for gases passing therethrough. Preferably, the second material comprises a porous ceramic material. It is also preferred that the ratio of the volume of the materials to the volume of the gap is 3. The heat source is in direct or indirect contact with the gaseous flow and provides heat thereto. Preferably, the heat source is an electric heating element.

The heating element may be made of a resistive material such that it becomes heated as an electric current passes there through as is well known in the art. The element can comprise any number of resistive materials suitable for obtaining a high temperature when an electric current passes there through. For example, the element can comprise a metallic material such as iron or nickel based alloys, iron or nickel based alloys containing aluminum and niobium, nickel aluminide, molybdenum disilicide (or other molybdenum silicides), silicon carbide, nickel chromium alloy, and the like. Conventional U-shaped elements based on molybdenum disilicide, silicon carbide, zirconia, carbon or boron nitride can be heated up to a 1900° C. element temperature. While the heating element is shown as a U-shaped in FIG. 6, it is to be understood that the heating element can comprise any number of shapes and types as are well known in the art. For example, the heating element can have a multiple number of connected U-shaped members or can be provided in a spiral shape or as coil shape or combinations. In one embodiment of this invention we provide for adding tungsten or tungsten bearing compounds to the heating element itself in order to obtain a convective plasma output from the product of this invention.

Furthermore, it is contemplated that hot air could be drawn directly out of the gap as it is simultaneously drawn from the outlet end of the blower or compressor or gas bottle delivering the gas. Moreover, additional fans may be utilized to aid in drawing the air from the blower. It is also contemplated that fins or baffles be utilized within the gap to aid in increasing residence time and raising the temperature of the air output from the fan. In operation, the blower, fan or compressor forces air (or other gas, if desired) into the inlet. When the air reaches the first material, it travels from the inlet side, through the pores, and out the outlet side. As noted above, the pores preferably provide a plurality of passageways through which the air may travel. It is even more preferred that the passageways have several turns and twists so that the air travels a "tortuous" path, as is known in the art. As also noted above, the pores within the material are preferably interconnected so that each pore is connected to a plurality of passageways extending from the inlet side to the inner side. The first material has a preferred porosity of 10 pores per inch, each pore having a diameter of about 0.01 inches.

The tortuous path provided by the pores serves at least two functions. First, as air travels the tortuous path, it absorbs the heat retained by the first material and received from the heating element. This preheating of the air helps to prevent the heating elements from cracking, as metallic elements have been known to do when they come in contact with air that is too cool relative to the temperature of the element. The amount of preheating that occurs depends upon the thickness of the material, the porosity of the material, and the size of the pores. The greater the thickness and porosity of the material, the more tortuous will be the path. The larger the pore size, the less tortuous the path.

The second function of the tortuous path is to help to prevent air from escaping the blower in the opposite direction of the intended flow. Thus, although air that becomes heated will have a tendency to rise from the inner side to the inlet side when the blower is used in the vertical position, the air will have difficulty doing so due to the complex and turbulent flow experienced within the gap upon exiting the material.

Once the air is discharged from the inner side, it enters the gap defined by the first material, the second material and the interior wall of the spacer. The gap can also be described as a cavity, space, or chamber. When air travels through the gap, it receives heat from the element by convection and radiation. The gap provides residence time for the air traveling from inner side of the first material to the inner side of the second material to become heated by the element. It is also believed that a complex combination of turbulent flow, convective flow, and recirculation zones occurring within the gap contribute to the heat imparted to the gas therein. Thus, when the air reaches the inner side of the second material, it has a higher temperature than when it first entered the gap through the inner side of the first material.

Like the first material, the second material also have a number of pores which are preferably interconnected so as to provide a tortuous path from the inner side to the outlet side of the material. It is also preferred that the second material have the same porosity of the first material. As in the first material, the pores of the second material provide a tortuous path for air traveling through the second material and cause the air to rise even higher in temperature as it travels through the material. The element in addition to being disposed within the gap, is preferably also disposed within the second material so as to provide additional heating of the air. The air is finally discharged through the outlet side of the second material and out the outlet end of the blower where is can be utilized by the user. Due to the tortuous paths provided by the materials and, the residence time provided by gap, the air exiting the blower at the outlet end is at a higher temperature than air brought into the blower through the inlet end.

The above descriptions provide examples of specifics of possible embodiments of the application and should not be used to limit the scope of all possible embodiments. Thus the scope of the embodiments should not be limited by the examples and descriptions given, but should be determined from the claims and their legal equivalents.

I claim:

1. A method for the rapid thermal joining of metallic or non-metallic objects in a non-vacuum environment comprising generating a thermal plasma through the heating of a gaseous flow, placing a joining material between the objects, applying the thermal plasma at an average temperature of over 1100° C. to the objects and the joining material whereby the joining material experiences a rapid heat-up wherein the objects are joined together.

2. The method of claim 1 wherein the thermal plasma is generated by a process where the plasma is produced by a heated fluid traveling through a tortuous path provided by two layers of a porous material separated by a gap wherein the porous material acts to provide multiple passageways for the heated fluid, wherein heat of the heated fluid is absorbed by the porous material and wherein the gap between the two layers of porous material allows for a residence time for the heated fluid wherein the combination of the heat absorbed by the porous material that defines the tortuous path and the gap results in enhanced temperatures and the rapid heat-up of the joining material.

3. The method of claim 1 wherein the joining material is a foil.

4. The method of claim 1 wherein the joining material is a powder.

5. The method of claim 1 wherein the joining material is comprised of aluminum.

6. The method of claim 1 wherein the joining material is comprised of carbon.

7. A method for the rapid thermal treatment of surfaces of metal and non-metal objects in a non-vacuum environment comprising generating a thermal plasma through the heating of a gaseous flow, placing of a joining material on a surface of the objects and applying the thermal plasma at an average temperature of over 1100° C. to the surface and the joining material whereby the joining material experiences a rapid heat-up.

8. The method of claim 7 wherein the joining material is a foil.

9. The method of claim 1 wherein the rapid thermal joining is performed in an unenclosed environment.

* * * * *